(12) United States Patent
Kurian et al.

(10) Patent No.: US 11,676,158 B2
(45) Date of Patent: Jun. 13, 2023

(54) AUTOMATIC REMEDIATION OF NON-COMPLIANCE EVENTS

(71) Applicant: KYNDRYL, INC., New York, NY (US)

(72) Inventors: John Kurian, Bangalore (IN); Hariharan N. Venkitachalam, Bengaluru (IN); HuyAnh Dinh Ngo, Sterling Heights, MI (US); Srinivas Babu Tummalapenta, Broomfield, CO (US)

(73) Assignee: KYNDRYL, INC., New York, NY (US)

( * ) Notice: Subject to any disclaimer, the term of this patent is extended or adjusted under 35 U.S.C. 154(b) by 78 days.

(21) Appl. No.: 16/890,107

(22) Filed: Jun. 2, 2020

(65) Prior Publication Data

US 2021/0374767 A1    Dec. 2, 2021

(51) Int. Cl.
*G06Q 10/00* (2023.01)
*G06Q 30/018* (2023.01)
(Continued)

(52) U.S. Cl.
CPC .......... *G06Q 30/0185* (2013.01); *G06F 9/542* (2013.01); *G06F 16/2358* (2019.01);
(Continued)

(58) Field of Classification Search
CPC .................. G06Q 10/06393; G06Q 10/06395
See application file for complete search history.

(56) References Cited

U.S. PATENT DOCUMENTS

| 9,749,311 B2 | 8/2017 | Jayanti Venkata et al. |
| 2007/0101432 A1* | 5/2007 | Carpenter ............ G06F 21/552 726/25 |

(Continued)

OTHER PUBLICATIONS

Du et al. Deeplog: Anomaly Detection and Diagnosis from System Logs through Deep Learning, 2017, CCS'17, 1285-1298 (Year: 2017).*

(Continued)

*Primary Examiner* — Hafiz A Kassim
*Assistant Examiner* — Zahra Elkassabgi
(74) *Attorney, Agent, or Firm* — Dan Housley; Andrew M. Calderon; Calderon Safran & Cole, P.C.

(57) ABSTRACT

A system and method for automatic remediation of non-compliance events are provided. In embodiments, a computer-implemented method includes: accessing a compliance profile and a remediation profile, wherein the compliance profile includes compliance data regarding rules for an enterprise and the remediation profile includes remediation data regarding remediation actions to address non-compliance with one or more of the rules; generating mapped data by mapping compliance data in the compliance profile to remediation data in the remediation profile; receiving non-compliance event data from a workload node in a network; extracting information from the non-compliance event data including the workload node associated with the event and a cause of event; determining a remediation action for the event based on the information and the mapped data; and invoking automatic performance of the remediation action at the workload node based on the determined remediation action.

17 Claims, 8 Drawing Sheets

(51) Int. Cl.
  *G06Q 10/10*     (2023.01)
  *G06Q 10/0639*   (2023.01)
  *G06F 9/54*      (2006.01)
  *G06F 16/23*     (2019.01)
  *G06F 40/205*    (2020.01)
  *G06F 21/60*     (2013.01)

(52) U.S. Cl.
  CPC .  *G06Q 10/06393* (2013.01); *G06Q 10/06395* (2013.01); *G06Q 10/10* (2013.01); *G06F 21/60* (2013.01); *G06F 40/205* (2020.01)

(56) References Cited

U.S. PATENT DOCUMENTS

| | | | | |
|---|---|---|---|---|
| 2010/0082803 | A1* | 4/2010 | Nguyen | G06Q 10/20 705/305 |
| 2015/0128250 | A1* | 5/2015 | Lee | G06F 21/554 726/16 |
| 2015/0281287 | A1* | 10/2015 | Gill | G06F 21/55 726/1 |
| 2016/0080422 | A1* | 3/2016 | Belgodere | G06N 5/048 706/47 |
| 2016/0088021 | A1* | 3/2016 | Jayanti Venkata | H04W 4/50 726/1 |
| 2017/0249644 | A1* | 8/2017 | DiMaggio | G06Q 30/018 |

OTHER PUBLICATIONS

Kloeckner et al., "Building a cognitive platform for the managed IT services lifecycle", https://ieeexplore.ieee.org/abstract/document/8269344, IBM Journal of Research and Development, Jan. 25, 2018, 11 pages.

Anonymous, "Method and system for self-learning compliance remediation", https://priorart.ip.com/IPCOM/000250263, IP.com Prior Art Database Technical Disclosure, Jun. 20, 2017, 4 pages.

Anonymous, "Automated Compliance Remediation", https://www.dashsdk.com/aws-compliance-remediation/, Dash Solutions, 2018, 8 pages.

Anonymous, "Chef inSpec", inspec.io/docs/, accessed May 29, 2020, 2 pages.

Anonymous, "DevOps Dashboard for Complete Operational Visibility. Automatically.", ChefAutomate, Sep. 2019, 2 pages.

Anonymous, "Ansible(software)", https://en.wikipedia.org/wiki/Ansible_(software), Wikipedia, accessed Apr. 26, 2020, 3 pages.

Anonymous, "Red Hat Ansible Tower", https://www.ansible.com/products/tower, Ansible.com, accessed Apr. 26, 2020, 6 pages.

Anonymous, "HCL Technologies to acquire select IBM software products", https://www.ibm.com/supply-chain/hcl-divestiture, IBM.com, accessed Apr. 14, 2020, 1 page.

Anonymous, "IT ServicesSoftware ProductsCustom DevelopmentMobile apps", rccsoft.com, accessed Apr. 14, 2020, 2 pages.

Mell et al., "The NIST Definition of Cloud Computing", NIST, Special Publication 800-145, Sep. 2011, 7 pages.

* cited by examiner

AUTOMATIC REMEDIATION OF NON-COMPLIANCE EVENTS

BACKGROUND

Aspects of the present invention relate generally to compliance management and remediation for enterprises and, more particularly, to automatic remediation of non-compliance events.

Enterprise systems and applications generally endeavor to ensure proper protection of their valuable data to maintain the integrity of information as well as to ensure continuity of service. Typically, as part of this exercise, regulatory bodies and companies' internal controls establish a set of guidelines or specifications (rules) for the enterprise system to adhere to. Various enterprise platforms have been developed to address enterprise control compliance. Compliance refers to the application of these mandated internal controls on the enterprise system. Enterprise applications and workflows may change rapidly in a cloud environment, requiring compliance to be tracked and valuated at a continuous and constant pace. This is referred to as continuous compliance.

SUMMARY

In a first aspect of the invention, there is a computer-implemented method including: accessing, by a computing device, a compliance profile, wherein the compliance profile includes compliance data regarding rules for an enterprise; accessing, by the computing device, a remediation profile, wherein the remediation profile includes remediation data regarding remediation actions that address non-compliance with one or more of the rules; generating, by the computing device, mapped data by mapping compliance data in the compliance profile to the remediation data in the remediation profile; receiving, by the computing device, non-compliance event data from a workload node in a network, wherein the non-compliance event data is associated with an event at the workload node where an action was non-compliant with one or more of the rules; extracting, by the computing device, information from the non-compliance event data including the workload node associated with the event and a cause of event; determining, by the computing device, a remediation action for the event based on the information and the mapped data; and invoking, by the computing device, automatic performance of the remediation action at the workload node based on the determined remediation action.

In another aspect of the invention, there is a computer program product including one or more computer readable storage media having program instructions collectively stored on the one or more computer readable storage media. The program instructions are executable to: generate mapped data by mapping compliance data in a compliance profile to remediation data in a remediation profile, wherein the compliance data includes rules for an enterprise and the remediation data includes remediation actions that address non-compliance with the one or more of the rules; receive non-compliance event data from a remote workload node in a network, wherein the non-compliance event data is associated with an event at the remote workload node where an action was non-compliant with one or more of the rules; extract information from the non-compliance event data; automatically determine a remediation action for the event based on the information and the mapped data; invoke automatic performance of the remediation action at the remote workload node based on the determined remediation action; and receive a status notification indicating whether the remediation action successfully addressed the non-compliance.

In another aspect of the invention, there is system including a processor, a computer readable memory, one or more computer readable storage media, and program instructions collectively stored on the one or more computer readable storage media. The program instructions are executable to: generate mapped data by mapping compliance data in a compliance profile to remediation data in a remediation profile, wherein the compliance data includes rules for an enterprise and the remediation data includes remediation actions to address non-compliance with the one or more of the rules; receive non-compliance event data from a workload node in a network, wherein the non-compliance event data is associated with an event at the workload node where an action was non-compliant with one or more of the rules; process the non-compliance event data based on prioritization rules by extracting information from the non-compliance event data; automatically determine a remediation action for the event based on the information and the mapped data; and invoke automatic performance of the remediation action at the workload node based on the determined remediation action

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
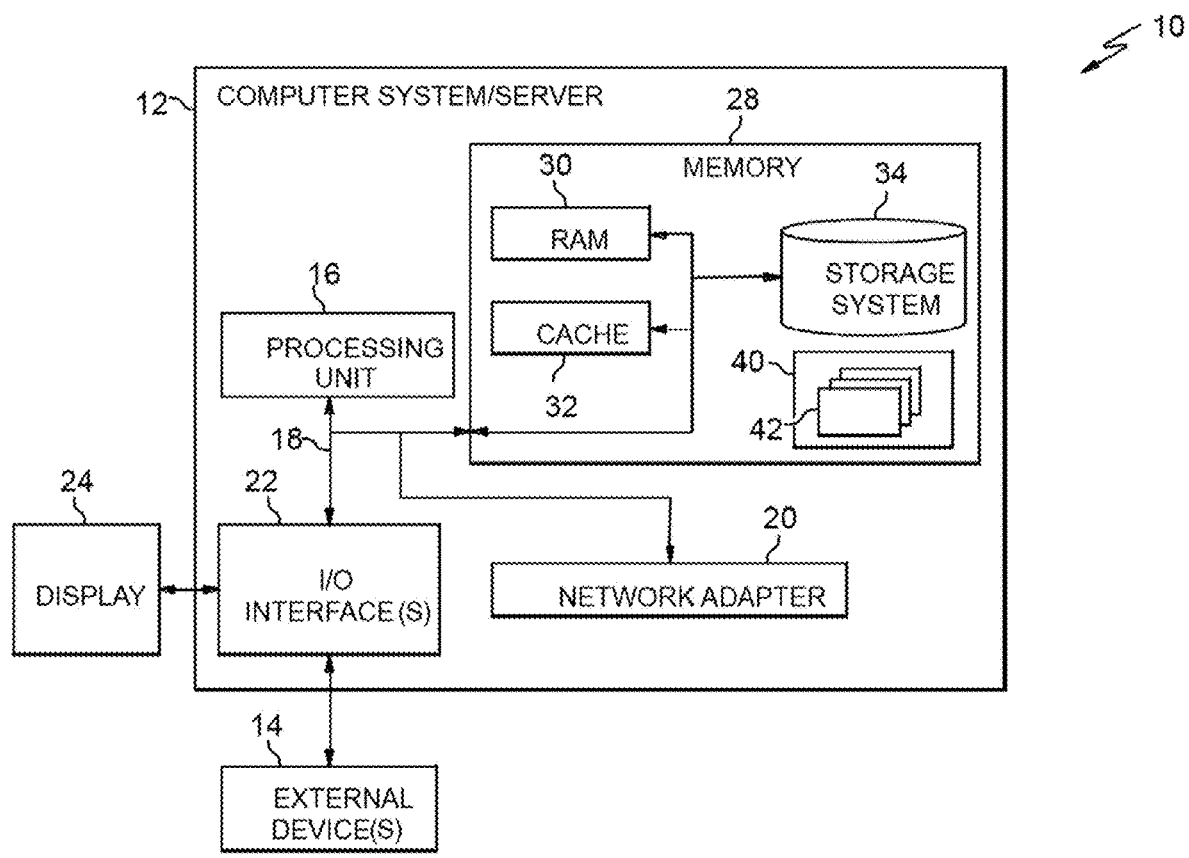
FIG. 1 depicts a cloud computing node according to an embodiment of the present invention.

Aspects of the present invention relate generally to compliance management and remediation for enterprises and, more particularly, to automatic remediation of non-compliance events. In embodiments, a system for ensuring continuous compliance and auto remediation in a hybrid cloud environment of platforms, applications and infrastructure automatically generates human-readable compliance rules and remediation actions from regulatory body guidance and industrial standards; creates a relation between an action set (remediation action) and platforms, systems and applications in the enterprise environment; analyzes non-compliance events within the enterprise environment to determine their origin and cause; iteratively invokes an action set at the origin of the non-compliance event until compliance is met; and creates an audit environment for compliance needs.

In general, technology changes at a very fast pace, thus underlying infrastructure and software also changes at a rapid pace. As a result, it is common for enterprise compliance rules and regulations to keep changing. Examples of enterprise systems include Virtual Machines, Servers, Application Servers, Database Servers and any other server applications or systems.

In general, enterprise compliance rules and regulations are different for different operating systems and middleware runtimes. Similarly, remediation actions necessary to address non-compliance with the rules and regulations may also vary based on the platform and type of application. As a result, it can be difficult to keep track of an enterprise's compliance position, especially when an enterprise system comprises a complex hybrid information technology (IT) environment, with a large number of platforms and applications, spanning internally-housed IT systems, private clouds and public cloud services. In such complex systems, manual compliance validation and remediation is not a practical solution.

Advantageously, embodiments of the invention utilize continuous compliance monitoring methods to keep track of changes that occur within a set of platforms and infrastructure (e.g., across multiple workload nodes in a network). In aspects, whenever there is a violation of a specified rule, a system emits an event notification. In implementations, a compliance enforcement bridge captures the event data, extracts information from the event data, and translates the information into a set of remediation actions to be executed to automatically address the violation of the specified rule at the source of the violation without the need for manual input.

In implementations, a system utilizes cognitive tools such as natural language processing to derive compliance rules and remediation actions from existing human readable (e.g., text-based) documents such as technical specifications, industry, regulatory or corporate requirements, Center for Internet Security (CIS) guidelines, etc. In aspects of the invention, cognitive tool outputs are interpreted to generate compliances rules and remediation actions. In embodiments, a metadata rule-based approach is supported, wherein the system can generate any structured form of compliance rules, which may be based on compliance standards such as CIS standards, or based on application server configurations. In such embodiments, the system may generate compliance rules and remediation actions in file formats based on extensible markup language (XML), JavaScript Object Notification (JSON), or other domain specific language (DSL). In implementations, derived compliance rules and remediation actions are checked against a grammar file, and a semantic tree is generated. In aspects, natural language processing tools are utilized to convert the semantic tree into a compliance profile and a corresponding remediation profile. Examples of natural language processing tools that may be utilized include: Java Compiler-Compiler (JavaCC), an open-source parser generator and lexical analyzer; ANother tool for Language Recognition (ANTLR™), a parser generator maintained by Terrance Parr; Yet Another Compiler-Compiler (YACC™), a parser generator for the Unix operating system. In embodiments, the compliance profile and the remediation profile are stored in a relational database, and a mapping is created to relate compliance files of the compliance profile with remediation files of the remediation profile.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
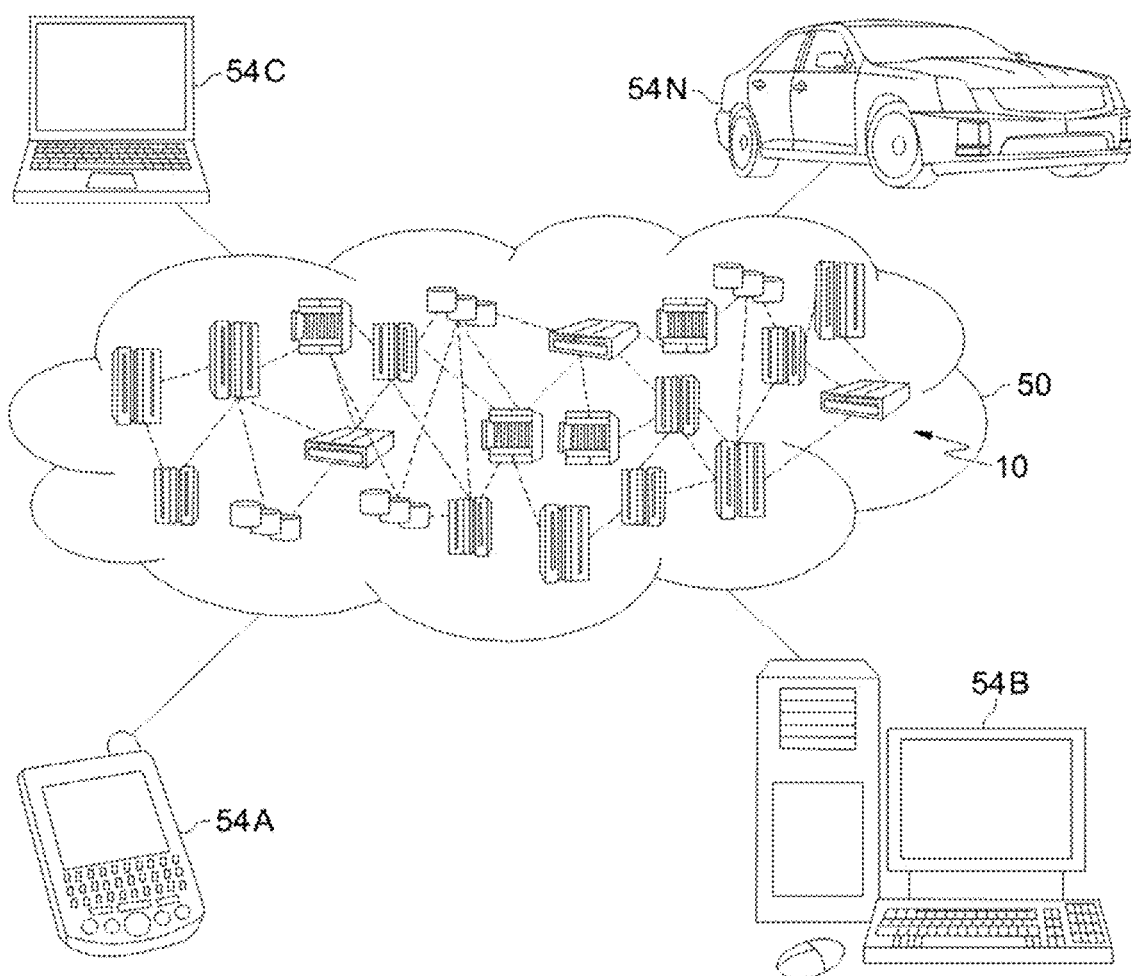
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
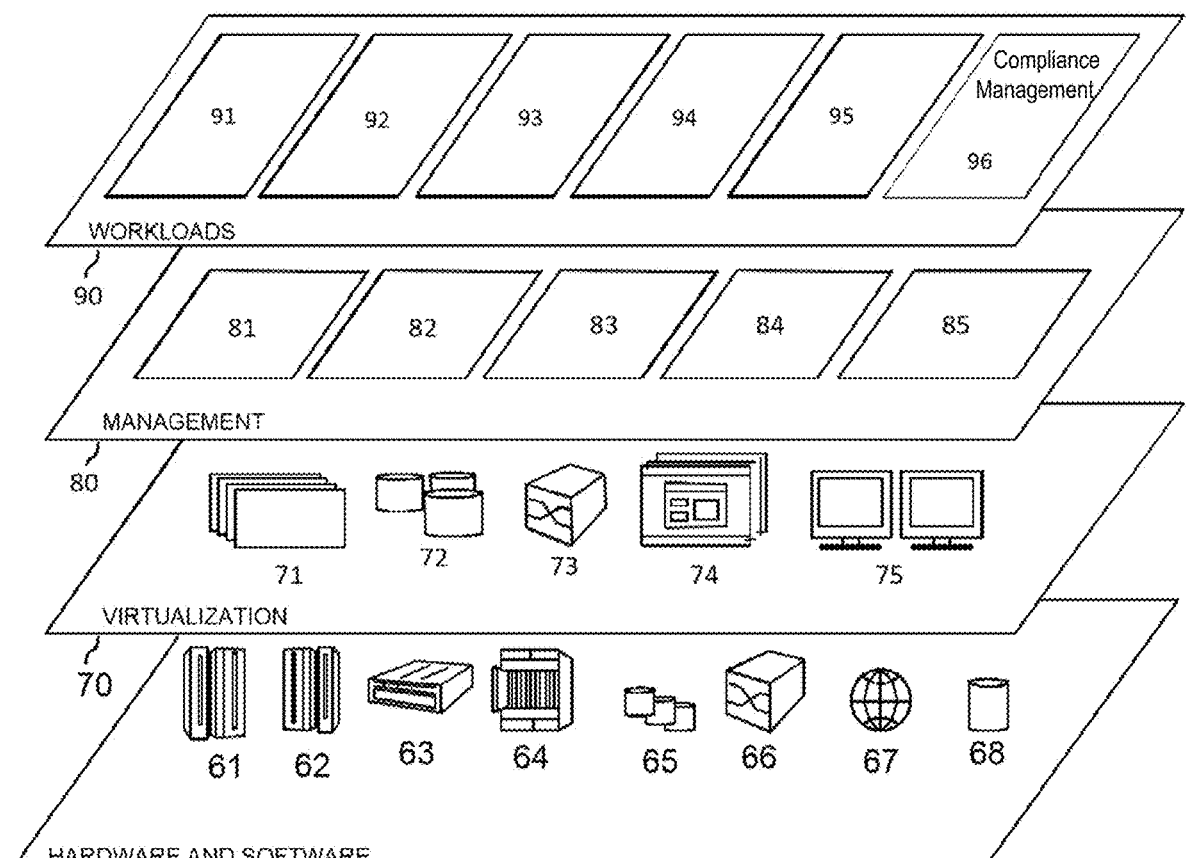
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compliance management 96.

Implementations of the invention may include a computer system/server 12 of FIG. 1 in which one or more of the program modules 42 are configured to perform (or cause the computer system/server 12 to perform) one of more functions of the compliance management 96 of FIG. 3. For example, the one or more of the program modules 42 may be configured to: generate a compliance profile, wherein the compliance profile includes compliance data regarding rules for an enterprise; generate a remediation profile, wherein the remediation profile includes remediation data regarding remediation actions to address non-compliance with one or more of the rules; generate mapped data by mapping compliance data in the compliance profile to remediation data in the remediation profile; receive non-compliance event data from a workload node in a network, wherein the non-compliance event data is associated with an event at the workload node wherein an action or function was non-compliant with one or more of the rules; extract information from the non-compliance event data including the workload node associated with the event and a cause of the non-compliance; determine a remediation action for the event based on the information and the mapped data; and invoke or initiate automatic performance of the remediation action at the workload node based on the determined remediation action.

Figure 4:
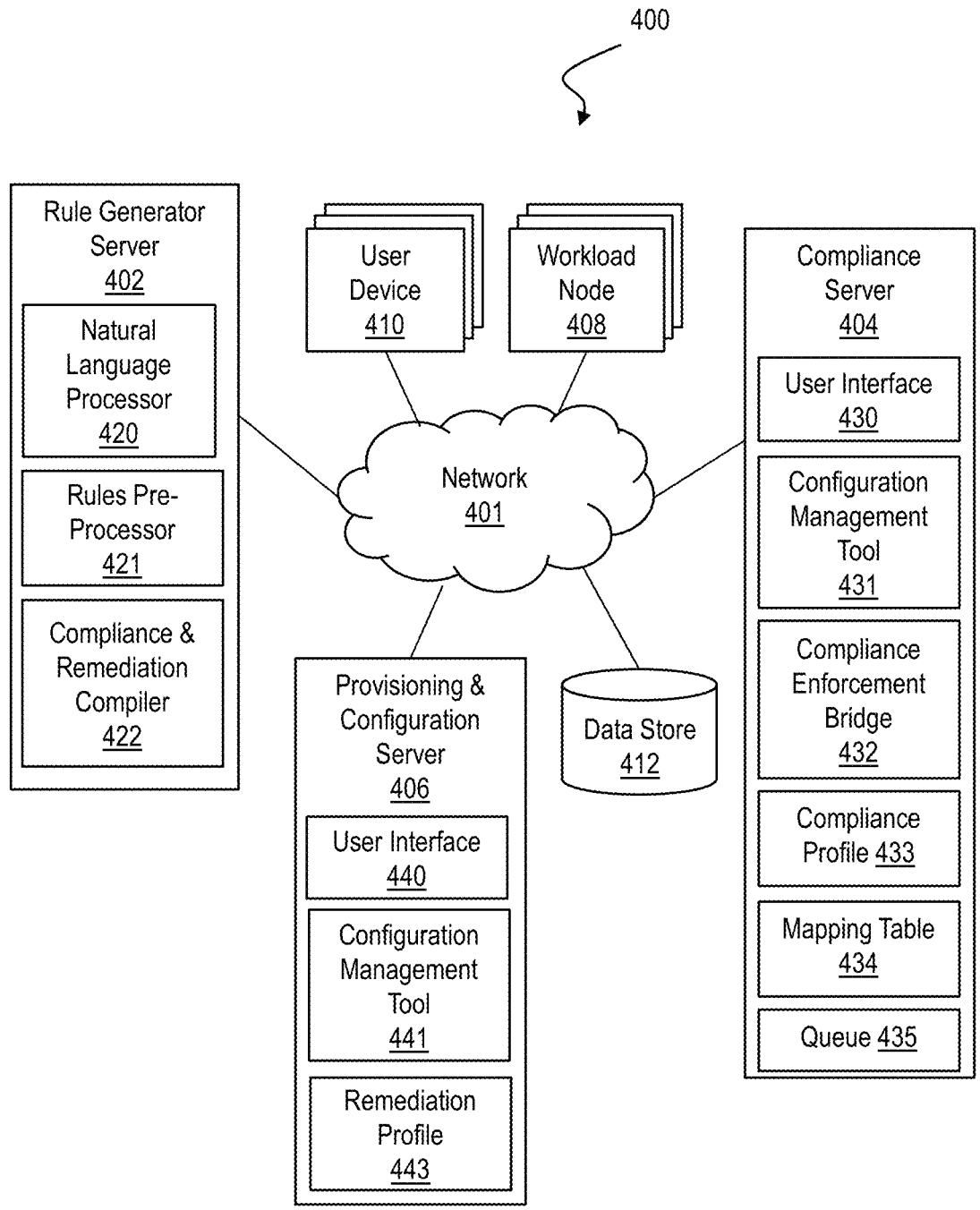
FIG. 4 shows a block diagram of an exemplary environment in accordance with aspects of the invention.

FIG. 4 shows a block diagram of an exemplary environment in accordance with aspects of the invention. In embodiments, a compliance management environment 400 includes a network 401 interconnecting one or more of: a rule generator server 402, a compliance server 404, a provisioning and configuration server 406, one or more workload nodes 408, one or more user devices 410 and a data store 412.

The network 401 may be any suitable communication network or combination of networks, such as a local area network (LAN), a general wide area network (WAN), and/or a public network (e.g., the Internet). In embodiments, the rule generator server 402, the compliance server 404, and the provisioning and configuration server 406 comprise nodes 10 in the cloud computing environment 50 of FIG. 2. In implementations, the rule generator server 402, the compliance server 404, and/or the provisioning and configuration server 406 provide cloud-based services to one or more clients via the network 401. In implementations, the provisioning and configuration server 406 is configured to initiate notifications and tickets as part of its workflow process based on continuous monitoring of the workload nodes 408.

The workload nodes 408 may comprise one or more computing devices (e.g., a web server) configured to perform functions or services for an enterprise, each computing device including components of the computer system 12 of FIG. 1. The user devices 410 may be any type of personal computing device, and may include components of the computer system 12 of FIG. 1.

Still referring to FIG. 4, the rule generator server 402 may include components of the computer system 12 of FIG. 1, and may comprise a special purpose computing device configured to automatically generate compliance and remediation profiles 433, 443 based on existing human-readable documents (e.g., text-based compliance documents). The rule generator server 402 may include one or more program modules (e.g., program module 42 of FIG. 1) executed by the rule generator server 402 and configured to perform one or more functions described herein. In embodiments, the rule generator server 402 includes one or more of the following program modules (e.g., program module 42 of FIG. 1): a natural language processor 420, a rules pre-processor 421 and a compliance and remediation compiler 422. In implementations, the natural language processor 420 is configured to analyze the human-readable documents to generate natural language data for use in generating the compliance and remediation profiles 433, 443. In aspects, the rules pre-processor 421 is configured to provide language rules (e.g., domain specific language rules) and semantic analysis functions for use in developing the compliance and remediation profiles 433, 443. In embodiments, the compliance and remediation compiler 422 is configured to utilize natural language data from the natural language processor 420 and semantic analysis and language rule data from the rules pre-processor 421 to generate the compliance and remediation profiles 433, 443.

The compliance server 404 may include components of the computer system 12 of FIG. 1, and may comprise a special purpose computing device configured to receive non-compliance event data from a workload node 408, map compliance data of the compliance profile 433 with remediation data of the remediation profile 443, and determine a remediation action to take at the workload node 408 to address the non-compliance event based on the mapped data. The compliance server 404 may include one or more program modules (e.g., program module 42 of FIG. 1) executed by the compliance server 404 and configured to perform one or more functions described herein. In embodiments, the compliance server 404 includes one or more of the following program modules (e.g., program module 42 of FIG. 1): a user interface 430, a configuration management tool 431, and a compliance enforcement bridge 432. In implementations, the user interface 430 is configured to provide notifications (e.g., notification of a remediation action) to users of the user devices 410. In aspects, the compliance management tool 431 is configured to provide non-compliance event data from a workload node 408 to the compliance enforcement bridge 432 for processing. In embodiments, the compliance enforcement bridge 432 is configured to extract information from the non-compliance event data, determine a remediation action to take to address the non-compliance event based on compliance data of the compliance profile 433 mapped to remediation data of the remediation profile 443, and initiate the performance of the remediation action via the provisioning and configuration server 406. In aspects, the compliance server 404 stores the compliance profile 433, a mapping table 434 of the mapped compliance and remediation data, and a queue 435 storing the non-compliance event data according to priority of the events based on prioritization rules.

The provisioning and configuration server 406 may include components of the computer system 12 of FIG. 1, and may comprise a special purpose computing device configured to automatically implement remediation actions at workload nodes 408 to address/resolve non-compliance events at the workload nodes 408. The provisioning and configuration server 406 may include one or more program modules (e.g., program module 42 of FIG. 1) executed by the provisioning and configuration server 406 and configured to perform one or more functions described herein. In embodiments, the provisioning and configuration server 406 includes one or more of the following program modules (e.g., program module 42 of FIG. 1): a user interface 440, and a configuration management tool 441. In implementations, the user interface 440 (e.g., a web-based dashboard) is configured to enable administrative access to functions and data stored in the provisioning and configuration server 406. In aspects, the configuration management tool 441 is configured to communicate with the compliance enforcement bride 432 of the compliance server 404 to coordinate and implement initiation of remediation actions at workload nodes 408 to address non-compliance events at the workload nodes 408, and store remediation status information in the data store 412 to create an event tracking log for auditing and reporting purposes. In aspects, the provisioning and configuration server 406 stores the remediation profile 443.

In embodiments, separate modules described above may be integrated into a single module. Additionally, or alternatively, a single module described above may be implemented as multiple modules. Moreover, the quantity of devices and/or networks in the environment 400 is not limited to what is shown in FIG. 4. In practice, the environment may include additional devices and/or networks; fewer devices and/or networks; different devices and/or networks; or differently arranged devices and/or networks than illustrated in FIG. 4.

Figure 5:
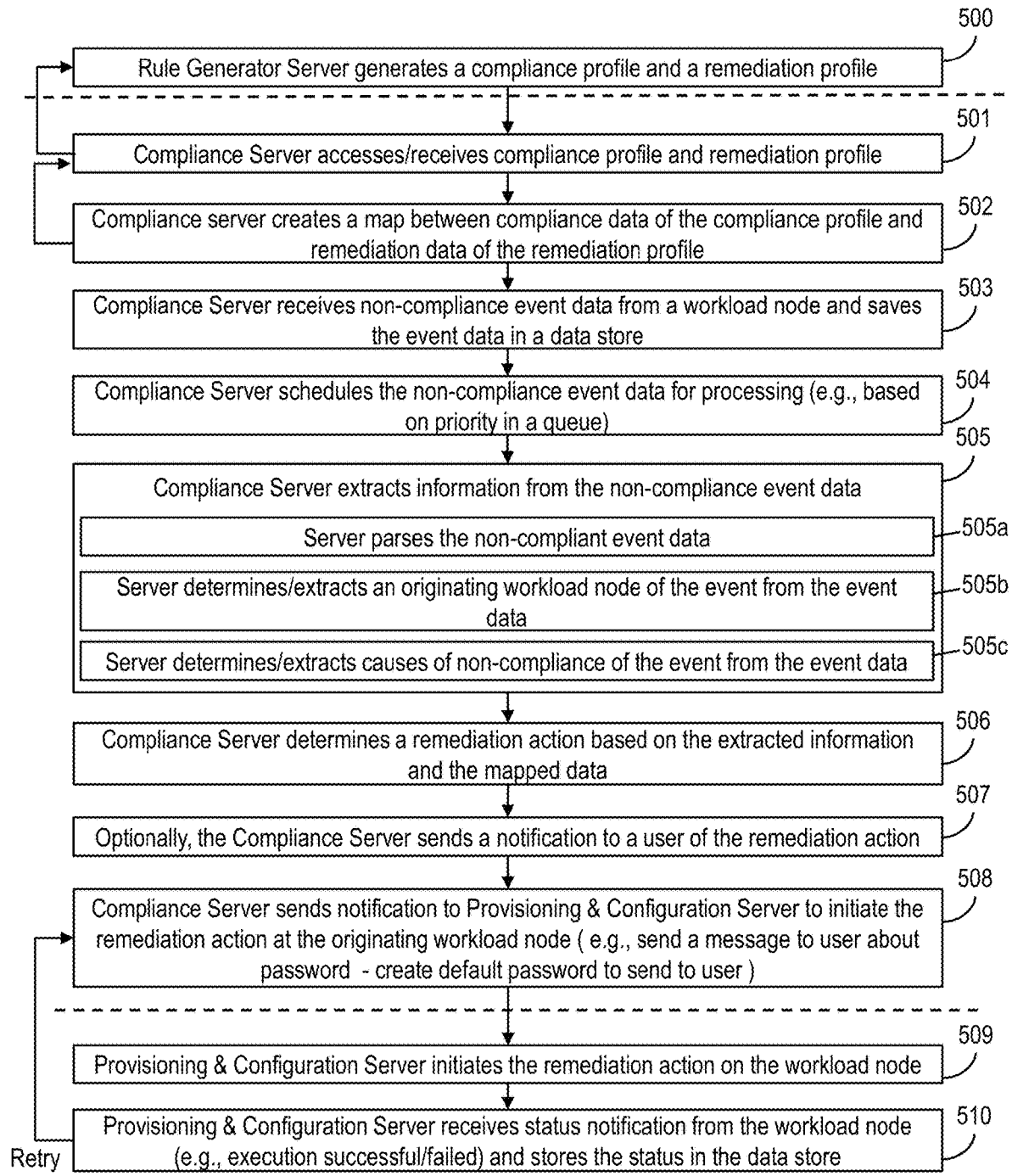
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the rule generator server 402 automatically generates a compliance profile 433 and a remediation profile 443 based on existing human-readable (e.g., text-based) documents providing guidance to enterprise users. In embodiments, the compliance profile 433 comprises compliance data regarding compliance rules (guidelines or specifications) obtained from one or more sources. The compliance data may include, for example, enterprise rules (e.g., security rules) for various types of hardware and/or software, and rule identification (ID) information. In embodiments, the remediation profile 443 comprises remediation data regarding remediation actions to take based on non-compliance with one or more rules of the compliance profile 433. The remediation data may include, for example, remediation actions associated with non-compliance of one or more rules for one or more types of hardware and/or software, and rule ID information associated with the one or more rules. In implementations, human readable documents such as technical specifications, industry, regulatory or corporate requirements, Center for Internet Security (CIS) guidelines, or other enterprise guidance, are processed utilizing cognitive tools such as natural language processing tools, and language rules (e.g., domain-specific language (DSL) rules) to generate the compliance profile 433 and the remediation profile 443. In embodiments, the rule generator server 402 provides the compliance profile 433 and/or the remediation profile 443 to one or more of the compliance server 404, the provisioning and configuration server 406, and the data store 412.

With continued reference to step 500 of FIG. 5, in embodiments, the natural language processor 420 of the rule generator server 402 processes the human-readable documents to produce compliance and remediation data; the rules pre-processor 421 of the rule generator server 402 supplies language rules for generating the compliance and remediation profiles 433, 443; and the compliance and remediation compiler 422 of the rule generator server 402 generates the compliance and remediation profiles 433, 443 based on the compliance and remediation data and the rules. In embodiments, the compliance and remediation profiles 433, 443 are periodically or continuously updated based on new versions of the human-readable documents received by the rule generator server 402. Additional details regarding step 500 are discussed below with respect to FIG. 7.

At step 501 the compliance server 404 accesses or receives the compliance profile 433 and remediation profile 443 generated by the rule generator sever 402 at step 500. In embodiments, the compliance profile 433 and remediation profile 443 are obtained directly from the rule generator server 402. In implementations, the compliance server 404 accesses a data store (e.g., data store 412) storing the compliance profile 433 and remediation profile 443 generated at step 500. In embodiments, the configuration management tool 431 of the compliance server 404 is configured to implement step 501.

At step 502, the compliance server 404 creates a map between the compliance data of the compliance profile 433 and the remediation data of the remediation profile 443. In embodiments, step 502 is performed periodically or continuously to create an updated map based on updates to the compliance profile 433 and/or remediation profile 443. In this way, the compliance server 404 may maintain an up-to-date map of the newest compliance and remediation data of an enterprise. Various mapping tools and methods may be utilized to implement step 502, such as the use of natural language processing tools and predetermined mapping rules. In embodiments, the compliance server 404 utilized metadata in the compliance profile 433 to create a relationship map between matching platforms, services and rules in the compliance profile and the remediation profile 443. In aspects, the mapping is an in-memory table (e.g., mapping table 434) or a tree structure. In implementations, steps 500-502 provide a method that is platform agnostic, and enables the method to be utilized across more than one software platform. In embodiments, the compliance enforcement bridge 432 of the compliance server 404 is configured to implement step 502.

At step 503, the compliance server 404 receives non-compliance event data (hereafter event data) from a workload node 408 of the compliance management environment 400, and saves the event data in a data store (e.g., data store 412). The term event data as used herein refers to data regarding an event occurring at a workload node 408 wherein one or more actions or functions were non-compliant with one or more predetermined rules (e.g., a rule is violated, a required action failed, or an action taken by a user was non-compliant with a rule). In one example, an event is non-compliant when a user of the user device 410 attempts to access data via a workload node 408 (a web server), and supplies a login password to the workload node 408 that does not comply with a predetermined security rule (e.g., the password does not meet a threshold length, an incorrect password was entered a threshold number of times, etc.). In this example, the web server provides a notification of the non-compliance event including event data (e.g., type of rule violated, the rule violated, timestamp data, identification (ID) of the workload node 408, etc.) to the compliance server 404. In embodiments, the compliance server 404 receives the event data in real-time upon detection of the non-compliance event by the workload node 408. It should be understood that the compliance server 404 may be in communication with any number of remote workload nodes 408 supplying event data to the compliance server 404 (e.g., in real-time). For example, the compliance server 404 may manage event data from multiple non-compliance events across multiple workload nodes 408 of the compliance management environment 400.

In embodiments, the compliance server 404 stores the event data in accordance with step 503 in a prioritized message queue 435 according to predetermined stored prioritization rules. Prioritization rules may include rules to prioritize non-compliance events based on the type of non-compliance event (e.g., how time-sensitive a response is based on the type of event), and the time of the non-compliance event (e.g., based on timestamp data), for example. In embodiments, the configuration management tool 431 of the compliance server 404 implements all or part of step 503. In implementations, the configuration management tool 431 is in the form of an enterprise platform enabling collaborative configuration and compliance (e.g., via a dashboard). One example of such a configuration management tool 431 is CHEF Automate™ by Chef Software Inc.

In embodiments, the compliance enforcement bridge 432 of the compliance server 404 implements all or part of step 503. In implementations, the prioritized message queue 435 is part of or in communication with the compliance enforcement bridge 432. In aspects of the invention, once the event data is stored in the prioritized message queue 435, the compliance enforcement bridge 432 sends a message to the configuration management tool 431 to acknowledge processing of the event data.

At step 504, the compliance server 404 schedules the event data for processing (e.g., based on the order of priority in the prioritized message queue 435). In implementations, the compliance enforcement bridge 432 of the compliance server 404 implements step 504.

At step 505, the compliance server 404 processes the event data to extract information therefrom. Natural language processing tools may be utilized by the compliance server 404 in the implementation of step 505. In embodiments, the processing includes the substeps: parsing the event data (505a); determining or extracting from the event data an originating workload node 408 from which the non-compliance event data was received (505b); and determining or extracting one or more causes of the non-compliance event (e.g., violation of a security password rule) from the event data (505c). In aspects of the invention, the compliance server 404 extracts failure controls from the event data, which identify a cause of a failure (non-compliance) and a rule associated with the failure. In implementations, the compliance server 404 can determine a difference (drift) between baseline compliance and remediation data in the compliance and remediation profiles 433, 443, and compliance and/or remediation data (e.g., security rules, etc.) at the workload node 408 based on the event data. For examples, changes (authorized or unauthorized) to compliance and/or remediation rules may be implemented (e.g., by users or malware) at the workload node that do not align with baseline compliance and/or remediation data. In aspects, the compliance server 404 can notify the workload node 408 of the difference and/or automatically initiate an action to address the difference (e.g., updating the compliance data at the workload node 408 in near real-time). In embodiments, the compliance enforcement bridge 432 of the compliance server 404 implements step 505.

At step 506, the compliance server 404 determines a remediation action to be performed to remediate (address or resolve) the non-compliance event based on the information extracted at step 505, data mapped at step 502, and the remediation profile 443 accessed or received at step 501. In one example, the compliance server 404 determines that a security password failure event for a particular software platform is mapped to a remediation action in the remediation profile 443 associated with that password failure event and software platform, wherein the remediation action requires a notification to be sent to a user to re-set the user's security password. In embodiments, the compliance enforcement bridge 432 of the compliance server 404 implements step 506. In implementations, the compliance enforcement bridge 432 sends the remediation action to the configuration management tool 431 of the compliance server 404. In an alternative embodiment, the compliance enforcement bridge 432 of the compliance server 404 initiates an API call to the configuration management tool 441 of the provisioning and configuration server 406, which causes the configuration management tool 441 to determine the remediation action (e.g., including instructions on how to implement the remediation action) from the remediation profile 442 based on the mapped data.

Optionally, at step 507, the compliance server 404 sends a notification of the remediation action to the user (e.g., a user of the user device 410), such as an administrator or a user associated with the non-compliance event. The notification may indicate that a remediation action has been automatically initiated for a particular non-compliance event, for example. In embodiments, the configuration management tool 431 of the compliance server 404 implements step 507. In an alternative embodiment, the provisioning and configuration server 406 sends the notification of the remediation action to the user (e.g., via the configuration management tool 441). The configuration management tool 441 of the provisioning and configuration server 406 may be an IT infrastructure automation platform for scheduling and notification management. One example of such a configuration management tool is Ansible Tower®, which is a registered trademark of Red Hat, Inc.

At step 508, the compliance server 404 sends a notification (e.g., instructions) to the provisioning and configuration server 406 to initiate the determined remediation action at the originating workload node 408 from which the event data was received. In one example, the compliance server 404 issues a notification to instruct the workload node 408 to create a default security password, and send the default security password to the user device 410 to address a non-compliance event wherein a user of the user device 410 violated a security password rule. In embodiments, the configuration management tool 431 of the compliance server 404 implements step 508. In an alternative embodiment, the provisioning and configuration server 406 determines the remediation action to take according to step 506, and sends a notification to the originating workload node 408 to initiate the remediation action.

At step 509, in embodiments, the provisioning and configuration server 406 initiates the remediation action determined at step 506 at the workload node 408 from which the non-compliance event originated (e.g., based on the notification received from the compliance server 404). In implementations, the configuration management tool 441 of the provisioning and configuration server 406 receives the notification from the configuration server 406 and initiates the remediation action based thereon.

At step 510, the provisioning and configuration server 406 receives a status notification from the workload node 408 and stores status data in a data store (e.g., data store 412) along with non-compliance event data to provide an event tracking log for auditing and reporting purposes. For example, the status data may include failure data indicating the remediation action failed or success data indicating that the remediation action was successful in addressing the non-compliance event. In embodiments, the provisioning and configuration server 406 can communicates status data to the configuration server 406, thereby triggering issuance of new notifications and the initiation of new remediation actions (retries) when necessary to address any failed remediation attempts.

Figure 6:
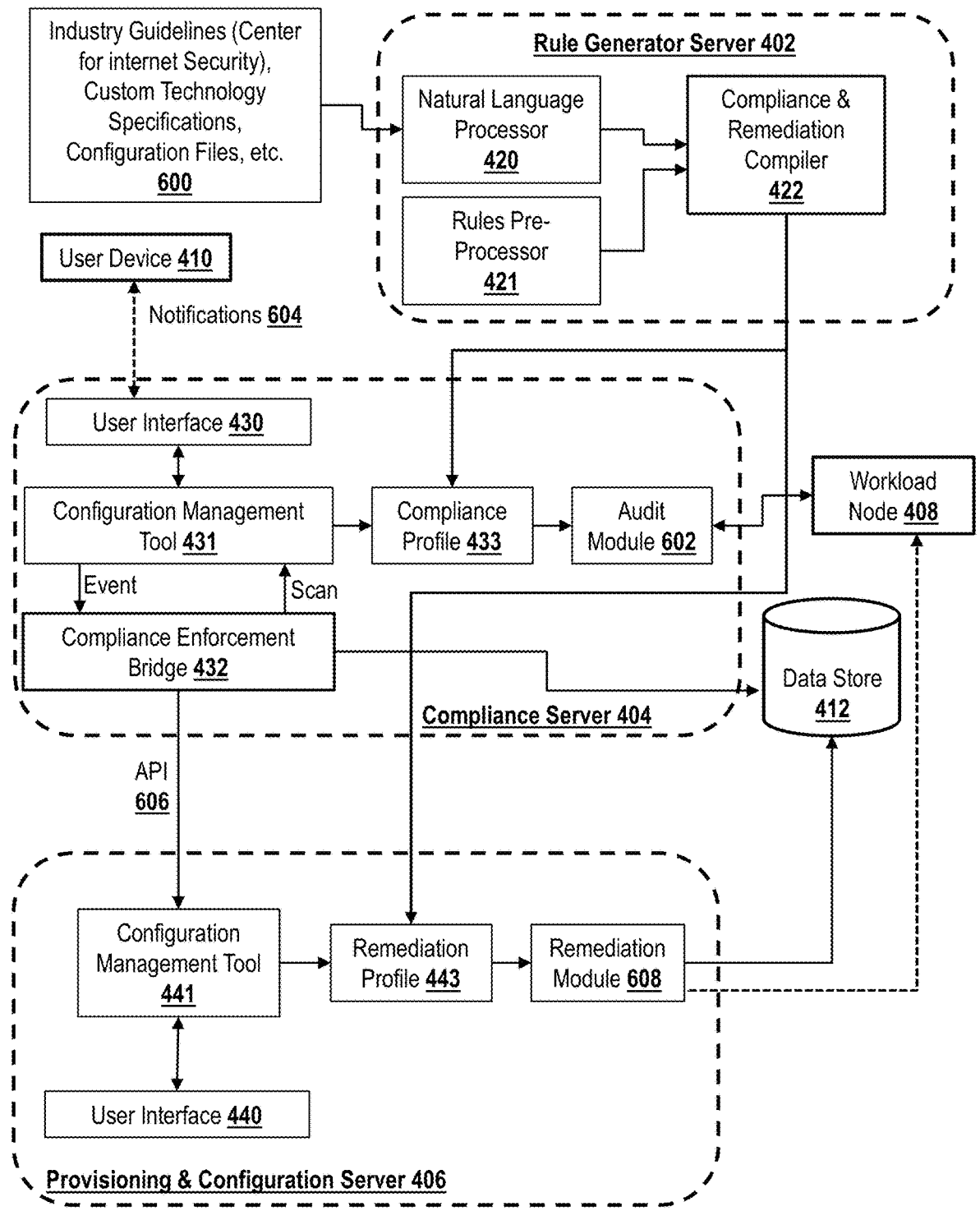
FIG. 6 is a flow diagram illustrating interactions between system components in accordance with aspects of the invention.

FIG. 6 is a flow diagram illustrating interactions between system components in accordance with aspects of the invention. Interactions illustrated in FIG. 6 may be carried out in the environment of FIG. 4, and are described with reference to elements depicted in FIG. 4.

As depicted in FIG. 6, in embodiments, the rule generator server 402 obtains a variety of existing human-readable documents 600 providing guidance to enterprise users for analysis by the natural language processor 420. In embodiments, the compliance and remediation compiler 422 utilizes natural language data from the natural language processor 420 (e.g., parsed data) and rules from the rules pre-processor 421 to generate the compliance profile 433 and the remediation profile 443, which are provide to the compliance server 404 and the provisioning and configuration server 406, respectively. In implementations, an audit module 602 of the compliance server 404 retrieves event data from a workload node 408 (e.g., via a secure shell (SSH) network protocol). Various testing and auditing software tools such as continuous compliance tools and methods may be utilized. One example of a continuous compliance tool that may be utilized in accordance with embodiments of the invention is INSPEC™ by Chef Software Inc.

In accordance with embodiments of the invention, the audit module 602 provides event data to the configuration management tool 431, which provides the event data for processing by the compliance enforcement bridge 432. In aspects, the compliance enforcement bridge 432 processes the event data and saves information extracted therefrom in the data store 412. The compliance enforcement bridge 432 may provide the configuration management tool 431 with the extracted data, enabling the configuration management tool 431 to identify compliance data from the compliance profile 433 that matches the extracted information. For example, the compliance enforcement bridge 432 may extract information from the event data identifying a rule that was violated by a user, and the configuration management tool 431 may identify the corresponding rule in the compliance profile 433. In implementations, configuration management tool 431 sends a notification 604 to a user device 410 associated with the non-compliance event via the user interface 430 of the compliance server 404. In embodiments, the user interface 430 comprises a dashboard of the configuration management tool 431.

With continued reference to FIG. 6, in embodiments, the compliance enforcement bridge 432 makes an API call 604 to the configuration management tool 441 of the provisioning and configuration server 406 to provide information regarding the non-compliance event to the provisioning and configuration server 406. In implementations, the configuration management tool 441 determines a remediation action that matches the event data based on a mapping of data between the compliance profile 433 and the remediation profile 443. In embodiments, a remediation module 608 of the provisioning and configuration server 406 sends instructions to the workload node 408 to initiate the remediation action to address the non-compliance event. Information regarding the event may also be shared without users via the user interface 440, which may be a dashboard of the configuration management tool 441. The remediation module 608 may comprise various remediation tools. One example of a remediation tool that may be utilized in accordance with embodiments of the invention is Ansible Tower®, which is a registered trademark of Red Hat, Inc.

Figure 7:
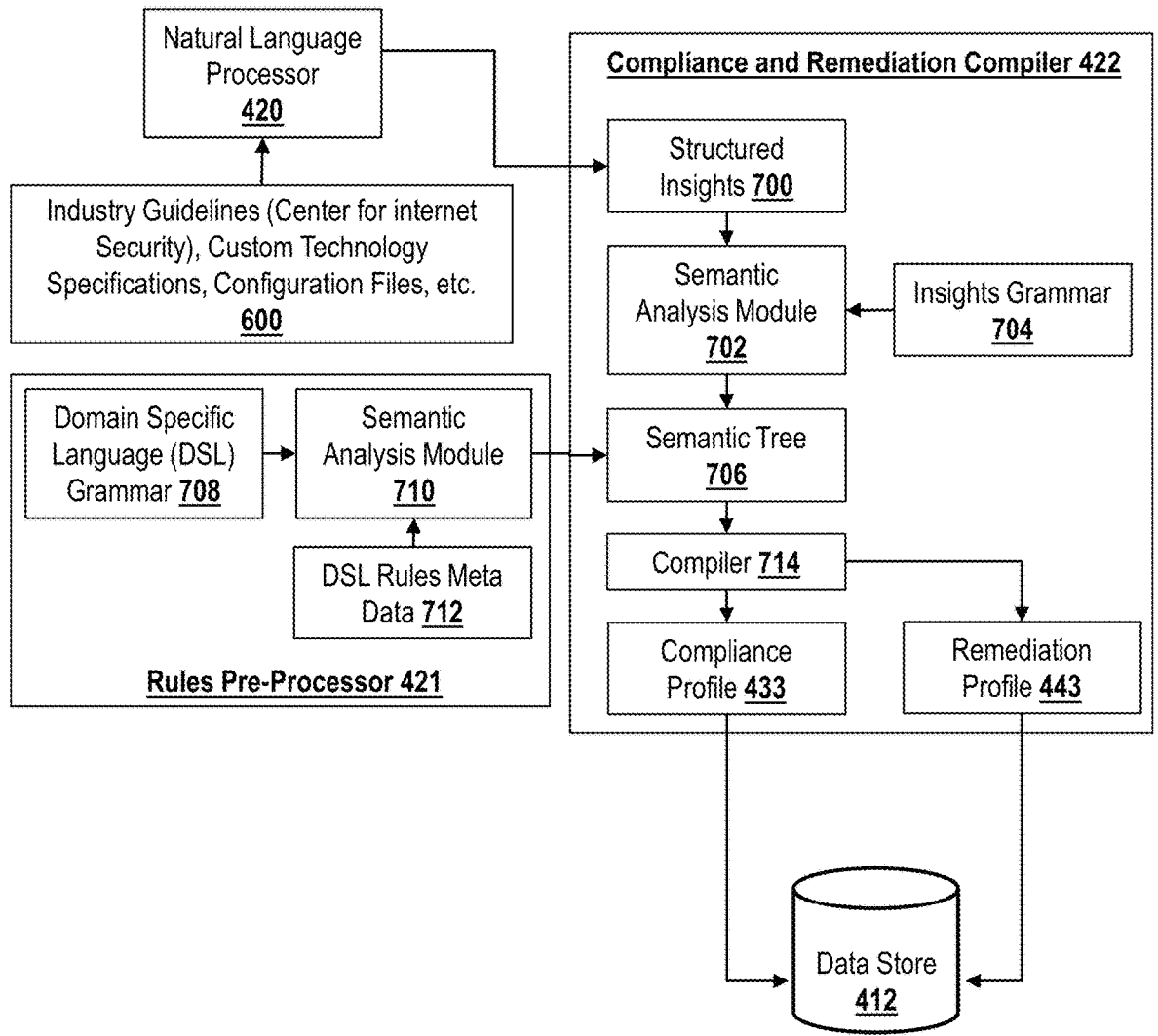
FIG. 7 illustrates the generation of compliance and remediation profiles in accordance with embodiments of the invention.

FIG. 7 illustrates the generation of compliance and remediation profiles in accordance with embodiments of the invention. Interactions illustrated in FIG. 7 may be carried out in the environment of FIG. 4, and are described with reference to elements depicted in FIGS. 4 and 6.

In embodiments, the compliance and remediation compiler 422 obtains natural language processing data in the form of structured insights 700 from human-readable documents 600, and feeds the data to a semantic analysis module 702 for semantic analysis based on insights grammar (grammar rules) 704. In general, semantic analysis is the process of relating syntactic structures, from the levels of phrases, clauses, sentences and paragraphs to the level of writing as a whole, to their language-independent meanings. Various semantic analysis tools and methods may be utilized in accordance with embodiment of the invention. In implementations, the semantic analysis module 702 generates a semantic tree 706 as an output which is fed to a compiler 714. In embodiments, the rules pre-processor 421 includes a semantic analysis module 710 which utilizes domain specific language (DSL) grammar (domain-specific grammar rules) 708 and DSL rules meta data 712 as input to the compliance remediation compiler 422, wherein the semantic tree 706 is generated based on input from the semantic analysis module 702 and the semantic analysis module 710. In implementations, the compiler 714 generates the compliance profile 433 and the remediation profile 443 based on the semantic tree 706, and stores the compliance and remediation profiles 433, 443 in the data store 412.

Figure 8:
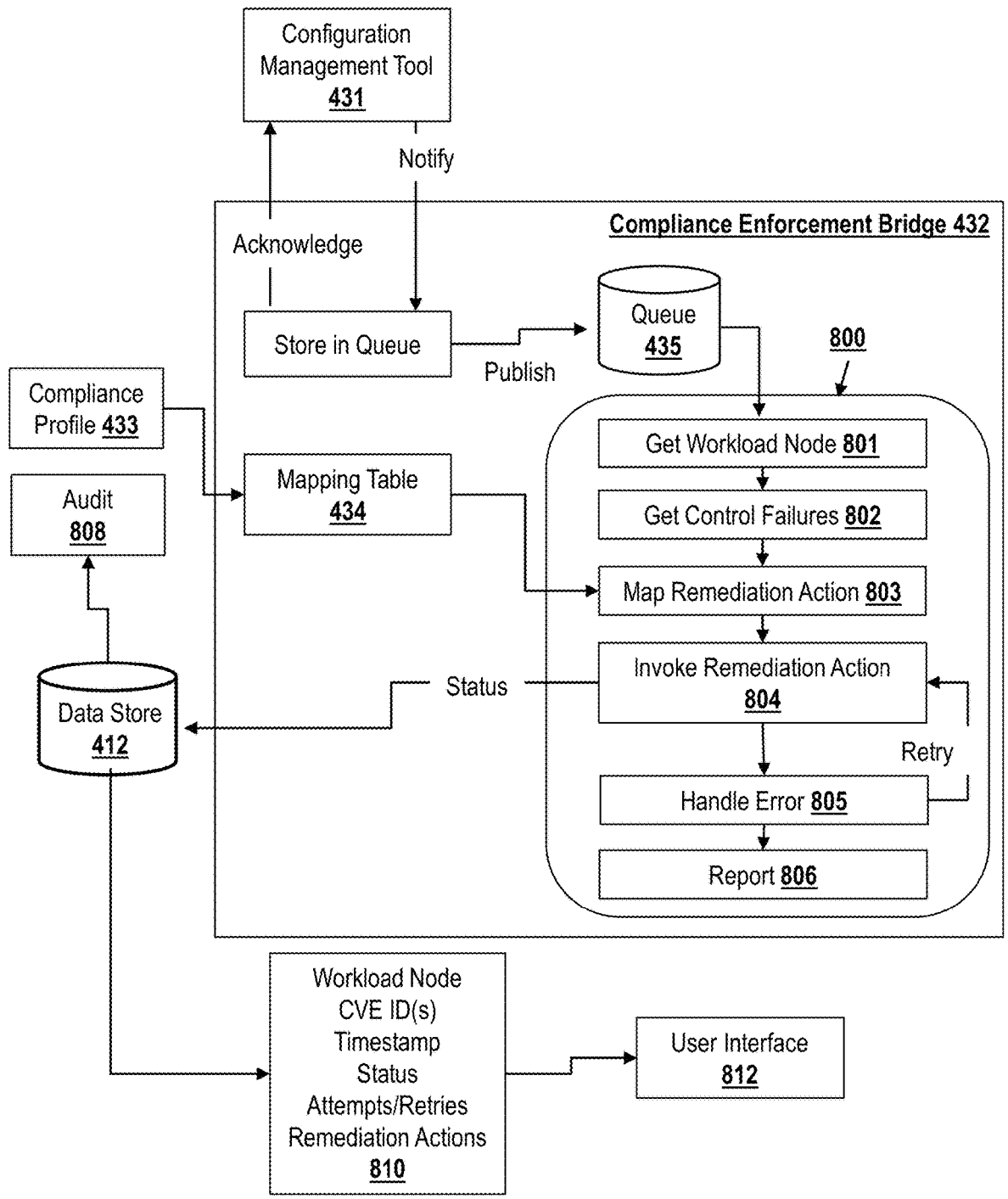
FIG. 8 illustrates interactions of the compliance enforcement bridge in accordance with embodiments of the invention.

FIG. 8 illustrates interactions of the compliance enforcement bridge in accordance with embodiments of the invention. Interactions illustrated in FIG. 8 may be carried out in the environment of FIG. 4, and are described with reference to elements depicted in FIGS. 4 and 6.

In accordance with embodiments of the invention, the configuration management tool 431 of the compliance server 404 notifies the compliance enforcement bridge 432 of a non-compliance event, and event data regarding the non-compliance event is stored in the queue 435 for processing at 800. In implementations, the compliance enforcement bridge 432: determines a workload node 408 from which the non-compliance event originated at step 801; determines control failure information (e.g., what caused the failure or non-compliance) at step 802; accesses the mapping table 434 (mapping data from the compliance profile 433 to data of the remediation profile 443) to map the workload node 408 and control failure information to a corresponding remediation action; and invokes the remediation action at step 804. In implementations, the compliance enforcement bridge 432 obtains status data from the workload node 408 (e.g., depicted in FIG. 4), either directly or via the provisioning and configuration server 406, indicating whether the remediation action successfully addressed the non-compliance event. If an error or failure status is received indicating that the non-compliance event was not successfully addressed, at step 805 the compliance enforcement bridge 432 initiates the invocation of another remediation action according to step 804, and repeats this process until a status update is received by the compliance enforcement bride 432 indicating that the non-compliance event was successfully remediated/addressed. At step 806, the compliance enforcement bridge 432 issues a report to one or more other components of the enterprise environment 400 of FIG. 4 indicating the status of the remediation activity. In implementations, remediation activity and information (e.g., the remediation action taken) is saved in the data store 412. In implementations, an audit module 808 may retrieve information from the data store 412 to provide insights into the functioning of the enterprise environment 400. In aspects, reporting information 810, such as a workload node 408 at issue, Common Vulnerabilities and Exposures (CVE) identification data (IDs), timestamp data, status data, number of remediation attempts/retries, and remediation actions taken are fed to a user interface 812 (e.g., a dashboard) associated with the compliance enforcement bridge 432 for access by users (e.g., user interface 440).

Based on the above, it can be understood that embodiments of the invention provide an automated way to detect ever-changing benchmarks (e.g., regulatory requirements), compile them automatically, track them on a continuous basis, and enforcing them in a timely manner. Methods of the invention not only help users attain their compliance posture but also improve their security posture. In accordance with embodiments of the invention, by continuously tracking and fixing benchmarks potential for vulnerabilities, weak policies can be remediated quickly thereby reducing application and data breaches. Additionally, implementations of the invention provide a security auditor with reliable audit logs, by which the auditor can track compliance violation, automatic action and user authorization.

In one exemplary use scenario, a large financial insurance provider requires compliance remediation. In this scenario, the provider utilizes a large installation of infrastructure as a service (IaaS) and platform as a service (PaaS) platforms, and regulatory demands require compliance processes for all the platforms and applications being maintained. Technical specifications for each of the application platforms include hardening rules (security rules). In this scenario, a system of the present invention provides continuous remediation for compliance to ensure the compliance posture of all the provider's systems on a real-time basis with appropriate auditing and reporting on a timely basis. In this example, the system of the present invention also provides notifications on any compliance drifts detected. In accordance with embodiments of the invention, the technical specifications are converted into compliance profiles including controls/ rule. Each compliance control/rule that can be auto-remediated is identified, and captured in a configuration file that indicates if a specific technical specification control can be automatically remediated with corresponding remediation logic. Appropriate remediation logic for each technical specification is also generated in the form of remediation profiles such that if any compliance drift is detected, the system can apply the remediation profile to remediate the controls in a seamless fashion. In accordance with this scenario, a scheduler (e.g., audit module 602) runs at regular intervals against the targeted systems (application platforms, PaaS, etc.) and checks against the compliance profiles/rules generated by the system. Any compliance drift (non-compliance events) detected during the scans can be notified through appropriate mechanisms (e.g., service management tools, and collaboration tools) such as the configuration management tool 431. In this example, a mapping (e.g., mapping table 434) between the compliance rules and remediation rules/logics are created through a configuration file (as not all remediation can be attempted as an automatic process). In accordance with embodiments of the invention, the system creates audit and compliance reports during every scheduled run on a real-time basis based on data stored in the data store 412.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    automatically generating, by a computing device, a compliance profile from text-based documents, including technical specifications, using natural language processing, wherein the compliance profile includes compliance data regarding rules for an enterprise;
    automatically generating, by the computing device, a remediation profile from the text-based documents using natural language processing, wherein the remediation profile includes remediation data regarding remediation actions that address non-compliance with one or more of the rules;
    generating, by the computing device, mapped data by utilizing metadata in the compliance profile to map software platforms, services and rules in the compliance data to matching software platforms, services and rules in the remediation data in the remediation profile;
    automatically iteratively updating, by the computing device, the compliance profile and the remediation profile using natural language processing in response to receiving new versions of the text-based documents, thereby generating updated compliance profiles and updated remediation profiles;
    automatically iteratively updating, by the computing device, the mapped data utilizing metadata in the updated compliance profiles to map the platforms, the services and the rules in compliance data of the respective updated compliance profiles to the matching platforms, services and rules in remediation data of the respective updated remediation profiles, thereby generating new mapped data that is platform agnostic for use across multiple software platforms;
    receiving, by the computing device, real-time non-compliance event data from one of a plurality of remote workload nodes in communication with the computing device in a cloud network, wherein the real-time non-compliance event data is associated with an event at the one of the pluralities of remote workload nodes where an action was non-compliant with one or more of the rules;
    extracting, by the computing device, information from the non-compliance event data including information identifying the one of the pluralities of remote workload nodes associated with the event and a cause of the event;
    mapping, by the computing device, the one of the pluralities of workload nodes and the cause of the event to a remediation action based on the new mapped data to determine the remediation action for the event;
    invoking, by the computing device, automatic performance of the remediation action at the one of the plurality of remote workload nodes based on the determined remediation action; and
    storing, by the computing device, the non-compliance event data for the event in a queue with other non-compliance event data from other events, wherein the event and the other events are prioritized based on predetermined rules, and wherein the extracting the information is performed according to the prioritization of the events in the queue,
    wherein the invoking the performance of the remediation action is performed iteratively for different remediation actions until the computing device receives an indication that compliance with the one or more of the rules has been met at the one of the plurality of remote workload nodes.

2. The method of claim 1, wherein the generating the mapped data comprises creating relationships in the mapped data between the remediation actions in the remediation profile and the software platforms, computing systems, and software applications associated with the rules in the compliance profile.

3. The method of claim 1, further comprising receiving, by the computing device, a status notification of non-compliance or compliance of the one or more of the rules subsequent to invoking the automatic performance of the determined remediation action.

4. The method of claim 3, further comprising saving, by the computing device, the non-compliance event data in a data store with the status notification, thereby generating an event tracking log.

5. The method of claim 1, wherein the extracting the information from the non-compliance event data comprises: parsing the non-compliance event data using additional natural language processing, thereby generated parsed data; extracting the one of the plurality of remote workload nodes associated with the event from the parsed data; and extracting the cause of the non-compliance from the parsed data.

6. The method of claim 1, wherein the computing device includes software provided as a service in a cloud environment, and wherein the computing device retrieves the real-time non-compliance event data from the one of a plurality of remote workload nodes via a secure shell (SSH) network protocol.

7. The method of claim 1, wherein the one of the plurality of remote workload nodes is a web server, wherein the cause of event is a password problem.

8. A computer program product comprising one or more computer readable storage media having program instructions collectively stored on the one or more computer readable storage media, the program instructions executable to:

automatically generate a compliance profile and a remediation profile from text-based documents, including technical specifications, using natural language processing, and store the compliance profile and remediation profile in a relational database;

automatically generate mapped data by utilizing metadata in the compliance profile to map platforms, services and rules in compliance data of the compliance profile to matching platforms, services and rules in remediation data in the remediation profile, wherein the compliance data includes rules for an enterprise and the remediation data includes remediation actions that address non-compliance with the one or more of the rules;

automatically iteratively update the compliance profile and the remediation profile using natural language processing in response to receiving new versions of the text-based documents, thereby generating new compliance profiles and new remediation profiles;

automatically iteratively update the mapped data utilizing metadata in the new compliance profiles to map the platforms, the services and the rules in compliance data of the respective new compliance profiles to the matching platforms, services and rules in remediation data in the respective new remediation profiles, thereby generating new mapped data that is platform agnostic for use across multiple software platforms;

receive real-time non-compliance event data from one of a plurality of remote workload nodes in a cloud network, wherein the real-time non-compliance event data is associated with an event at the one of the plurality of remote workload nodes where an action was non-compliant with one or more of the rules;

extract information from the non-compliance event data including information identifying the one of the plurality of remote workload nodes associated with the event and a cause of the event;

map the one of the plurality of workload nodes and the cause of the event to a remediation action based on the new mapped data to determine the remediation action for the event;

invoke automatic performance of the remediation action at the one of the plurality of remote workload nodes based on the determined remediation action;

receive a status notification indicating whether the remediation action successfully addressed the non-compliance; and store the non-compliance event data for the event in a queue with other non-compliance event data from other events, wherein the event and the other events are prioritized based on predetermined rules, and wherein the extracting the information is performed according to the prioritization of the events in the queue.

9. The computer program product of claim 8, wherein the generating the mapped data comprises creating relationships in the mapping data between the remediation actions in the remediation profile and the software platforms, computing systems, and software applications associated with the rules in the compliance profile.

10. The computer program product of claim 8, wherein the program instructions are further executable to invoke automatic performance of a subsequent remediation action at the one of the plurality of remote workload nodes based on the status notification to address the non-compliance, wherein the invoking the performance of the remediation action is performed iteratively until a status notification indicates that compliance with the one or more of the rules has been met at the one of the plurality of remote workload nodes.

11. The computer program product of claim 8, wherein the program instructions are further executable to save the non-compliance event data in a data store with the status notification, thereby generating an event tracking log.

12. The computer program product of claim 8, wherein the information includes the one of the plurality of remote workload nodes associated with the event and a cause of the non-compliance, and wherein the extracting the information from the non-compliance event data comprises: parsing the non-compliance event data using additional natural language processing, thereby generating parsed data; extracting the one of the plurality of remote workload nodes associated with the event from the parsed data; and extracting the cause of the non-compliance from the parsed data.

13. A system comprising:
a processor, a computer readable memory, one or more computer readable storage media, and program instructions collectively stored on the one or more computer readable storage media, the program instructions executable to:

generate a compliance profile and a remediation profile from text-based documents using natural language processing and semantic analysis;

generate mapped data by utilizing metadata in the compliance profile to map platforms, services and rules in compliance data in the compliance profile to matching platforms, services and rules in remediation data in the remediation profile, wherein the compliance data includes rules for an enterprise and the remediation data includes remediation actions to address non-compliance with the one or more of the rules;

iteratively update the compliance profile and the remediation profile using natural language processing and semantic analysis in response to receiving new text-based documents, thereby generating new compliance profiles and new remediation profiles;

iteratively update the mapped data utilizing metadata in the new compliance profiles to map the platforms, the services and the rules in compliance data of the respective new compliance profiles to the matching platforms, services and rules in remediation data in the respective new remediation profiles, thereby generating new mapped data;

receive real-time non-compliance event data from one of a plurality of remote workload nodes in a cloud network, wherein the real-time non-compliance event data is associated with an event at the one of a plurality of remote workload nodes where an action was non-compliant with one or more of the rules;

process the non-compliance event data based on prioritization rules by extracting information from the real-time non-compliance event data including information identifying the one of the plurality of remote workload nodes and a cause of the event;

map the one of the plurality of workload nodes and the cause of the event to a remediation action based on the new mapped data to determine the remediation action for the event;

invoke automatic performance of the remediation action at the one of the plurality of remote workload nodes based on the determined remediation action; and store the non-compliance event data for the event in a queue with other non-compliance event data from other events, wherein the event and the other events are prioritized based on predetermined rules, and wherein the extracting the information is performed according to the prioritization of the events in the queue.

14. The system of claim 13, wherein the generating the compliance profile and the remediation profile utilizing natural language processing and semantic analysis comprises: utilizing the natural language processing to generate natural language processing data in the form of structured insights and feeding the natural language process data to a semantic analysis module for the semantic analysis based on predetermined rules, thereby producing a semantic tree as an output of the semantic analysis module, wherein the compliance profile and the remediation profile are generated based on the semantic tree.

15. The system of claim 13, wherein the generating the mapped data comprises creating relationships in the mapped data between the remediation actions in the remediation profile and the software platforms, computing systems, and software applications associated with the rules in the compliance profile.

16. The system of claim 13, wherein the program instructions are further executable to:
receive a status notification indicating whether the remediation action successfully addressed the non-compliance; and
invoke performance of a subsequent remediation action at the one of the plurality of remote workload nodes based on the status notification to address the non-compliance, wherein the invoking the performance of the remediation action is performed iteratively until a status notification indicates that compliance with the one or more of the rules has been met at the one of the plurality of remote workload nodes.

17. The system of claim 13, wherein the extracting the information from the non-compliance event data comprises: parsing the non-compliance event data using additional natural language processing, thereby generating parsed data; extracting the one of the plurality of remote workload node nodes associated with the event from the parsed data; and extracting the cause of the non-compliance from the parsed data.

\* \* \* \* \*